United States Patent [19]

Oka et al.

[11] Patent Number: 4,989,249
[45] Date of Patent: Jan. 29, 1991

[54] METHOD OF FEATURE DETERMINATION AND EXTRACTION AND RECOGNITION OF VOICE AND APPARATUS THEREFORE

[75] Inventors: Ryu-ichi Oka, Tsukuba; Hiroshi Matsumura, Kazo, both of Japan

[73] Assignees: Sanyo Electric Co., Ltd., Osaka; Agency of Industrial Science and Technology, Tokyo, both of Japan

[21] Appl. No.: 196,390

[22] Filed: May 20, 1988

[30] Foreign Application Priority Data

May 29, 1987 [JP] Japan .............................. 62-136377
Sep. 30, 1987 [JP] Japan .............................. 62-248915

[51] Int. Cl.$^5$ .............................................. G10L 7/08
[52] U.S. Cl. ..................................................... 381/43
[58] Field of Search ................................... 381/41–47;
369/513.5

[56] References Cited

U.S. PATENT DOCUMENTS 4,718,093 1/1988 Brown ................................... 381/43

Primary Examiner—Gary V. Harkcom
Assistant Examiner—John A. Merecki
Attorney, Agent, or Firm—Darby & Darby

[57] ABSTRACT

A voice recognition method and apparatus in which a scalar time-space field pattern lattice plane having an abscissa and an ordinate, with one being the time axis and the other the space axis, is obtained from a voice signal inputted as a recognition object, and a voice characteristic pattern based upon said time-space pattern is to be formed as a standard pattern or to be matched with a standard pattern to recognize a characteristic of the inputted voice. The scaler time-space field pattern is converted to extract a vector field pattern lattice corresponding to each lattice point of the scalar time-space field pattern lattice plane with each vector of the vector field pattern lattice having a quantity and an angular orientation value. The angular orientation values of the vector field pattern lattice are placed into one of N groups, each group corresponding to a range of vector angular orientation values, and a set of N two dimensional lattices are formed with each lattice corresponding to one of the vector angular orientation ranges and each point of the lattice having the quantity parameter of the corresponding point of the vector field pattern lattice. The patterns of the N two dimensional lattices have the voice characteristic information can be used as standards or to be matched with standard patterns. There can be blurring processing of the quantity values of the N two dimensional lattices to account for speech variations, such as between male and females, and the resulting lattices of the blurring processing used as standards or for matching.

42 Claims, 14 Drawing Sheets

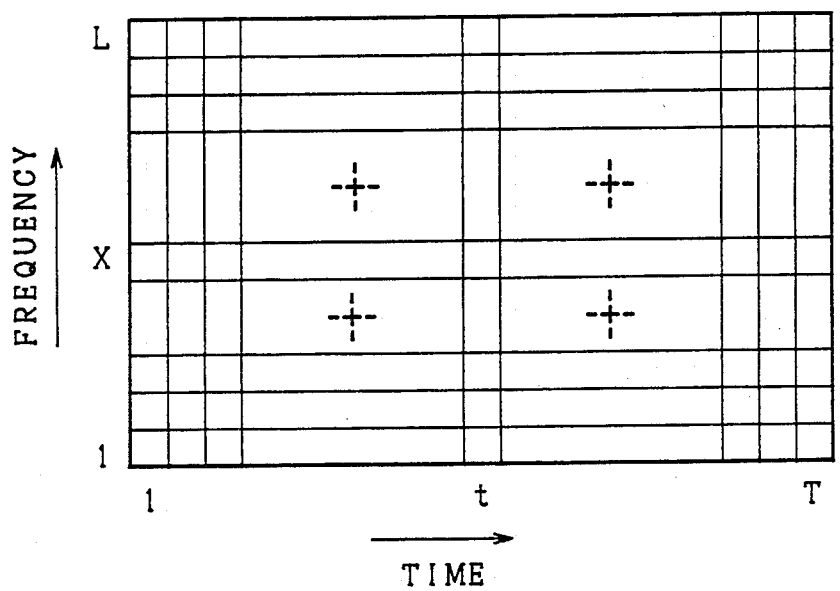
Fig. 4
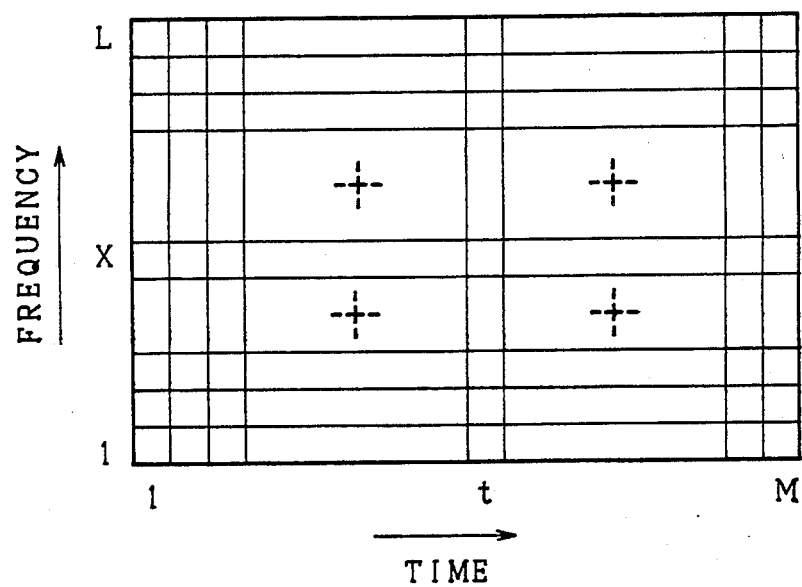

| 1 | 3 | 9 | 15 | 20 | 15 | 9 | 3 | 1 |

Fig. 12

| 1 | 1 | 1 | 1 | 1 | 1 | 1 | 1 | 1 |

Fig. 13

|   |   |   |   | 15 |    |   |   |   |
|---|---|---|---|----|----|---|---|---|
| 1 | 3 | 9 | 15| 20 | 15 | 9 | 3 | 1 |
|   |   |   |   | 15 |    |   |   |   |

Fig. 14

|   |   |   |   | 1 |   |   |   |   |
|---|---|---|---|---|---|---|---|---|
| 1 | 1 | 1 | 1 | 1 | 1 | 1 | 1 | 1 |
|   |   |   |   | 1 |   |   |   |   |

Fig. 15

|   |   |   | 0.25 |   |   |   |
|---|---|---|------|---|---|---|
| 1 | 1 | 1 | 1    | 1 | 1 | 1 |
|   |   |   | 0.25 |   |   |   |

FIRST R FRAME
SECOND R FRAME
THIRD R FRAME

TIME → t

METHOD OF FEATURE DETERMINATION AND EXTRACTION AND RECOGNITION OF VOICE AND APPARATUS THEREFORE

BACKGROUND OF THE INVENTION

1. Field of the Invention

This invention relates to a method and an apparatus of voice recognition or a method of feature extraction of voice used therein. More specifically, it relates to a method and apparatus through which a high recognition rate can be obtained by utilizing a pattern of a vector field.

2. Description of the Prior Art

Voice recognition, in general, involves a system in which standard voice patterns obtained by extracting the characteristics of words to be recognized are prepared for each word. The characteristic pattern extracted similarly from the voice inputted as the object of recognition and a plurality of standard patterns are matched to obtain the most similar standard pattern. The word which falls under this standard pattern is determined as being inputted. In the past, as the aforementioned characteristic pattern, the time-space pattern of a scalar field itself which is represented by a time axis as the abscissas and a space axis as the ordinates has been used. As such a time-space pattern of the scalar field, there are various time-space patterns such as cepstrum employing quefrency as the space axis, PARCOR coefficient, LSP coefficient and vocal tract area function. Spectrum employing a frequency as the space axis is typical.

As a problem to be solved in the field of voice recognition, there is a response to mass speakers or to a non-specified speaker, in which a number of standard patterns were prepared for one word to improve the recognition rate. In addition, DP matching which can absorb the variation of time axis has been developed to respond to the case where speaking rates of the same speaker might differ.

In the conventional apparatus employing the time-space pattern of the scalar field itself as the characteristic, when a large vocabulary or a non-specified speaker have to be recognized, the recognition rate was not always satisfactory. Even through a number of standard patterns are prepared for one word or DP Matching is used as described as above, a real solution could not be achieved. Thus, realization of the voice recognition system for the large vocabulary or a non-specified speaker is yet to be attained. Therefore, one of the present inventors has proposed, in Japanese Patent Application Laid-Open No. 60-59394, and "Comparison Studies on the Effectiveness Between the Vector Field of Spectrum and Spectrum for Speech Recognition" in The Transaction of the Institute of Electronics and Communication Engineers of Japan (D) vol. J69-D No. 11, P1704 (1986), to obtain the spectral vector field pattern by the space differentiation of the scalar field spectrum which is the time-space pattern of time-frequency for use as the features of voice.

In the past, research using the partial differentiation of the time-space point of spectrum as the feature was performed by T. B. Martin, and disclosed in "Practical Applications of Voice Input to Machines" Proc. IEEE, 64-4 (1976). However, T. B. Martin has calculated $\partial f(t,x)/\partial t$, $\partial f(t,x)/\partial x$ from the time-space pattern $f(t,x)$, thereby constituting the function which recognizes 32 different types of vocal sounds with respect to each frame and using the result expressed in 32 values of the linear matching in word units, differing from the apparatus in which the spectral vector field is produced from the spectral scalar field aforementioned.

SUMMARY OF THE INVENTION

A first object of this invention is to provide a method of characteristic extraction and recognition of voice and a recognition apparatus which are improved for practical use by pushing the aforementioned apparatus a step further from an industrial point of view.

A second object of this invention is to provide a method of characteristic extraction and recognition of voice and a recognition apparatus which are suitable for recognizing a syllable and word at a high recognition rate.

A third object of this invention is to provide a method of characteristic extraction and recognition of voice and a recognition apparatus which are possible to obtain a high recognition rate at voice recognition of a large vocabulary and a non-specified speaker.

A fourth object of this invention is to provide a method of characteristic extraction and recognition of voice and a recognition apparatus which have a short calculation time.

The present invention is basically characterized in that, the time-space pattern of a scalar field governed by a time axis and a space axis is obtained by analyzing the voice signal. The time-space pattern is used to extract the voice characteristic by converting the time-space pattern into a vector field pattern which has a quantity and a direction at each lattice point of space by the space differentiation, quantizing the orientation parameter of the vector of said vector field pattern in value N (N: positive integral number), and grouping each vector having the same quantization value. Thereafter are formed directionally arranged two-dimensional patterns N whose vector quantity is the value of each lattice point. The directionally arranged two-dimensional pattern is extracted as the characteristics of voice.

In the input voice signal, the orientation parameter of the vector is quantized from the time-space pattern of the scalar field governed by the time axis and the space axis, and converted into a plurality of directionally arranged two-dimensional patterns grouped in every quantized direction. The characteristic pattern is obtained by this processing. Since this pattern is constituted by space differentiation of the time-space pattern or information of time-space variation, it clearly shows the vocal sound and is hardly influenced by the change of speakers. Moreover, the variation of vector field is absorbed by quantization of the orientation parameter. Also, different from the case where the vector field pattern itself is the characteristic pattern, operation of complex number is not required. Thus, the calculation is simplified.

In addition, in the present invention, blurring processing is performed on the directionally arranged two-dimensional pattern to integrate the orientation pattern characteristic, thus the characteristic is emphasized and stabilized. The integration is intended for a kind of structuralization of the time-space point (t,x). That is, the structuralization is to add the vector of maximum N to the time-space point (t,x), when the orientation patterns of N are considered in integration (refer to FIG. 1). Thus, advantages of voice recognition by this method exist in creating the feature which expresses the vocal sound more and in its stable expression. It is assumed that the feature of vocal sound in responsive to the variation of spectrum in a certain time-space interval. The characteristic is first extracted in the spectral vector field microscopically, and after the vectors in the different directional interval have been regarded as the independent features, they are grouped and integrated at each time-space point. When grouped in every direction and integrated in the blurring mask pattern, a more macroscopical feature (a voice characteristic created by a wide time-space range) is held as retaining the structural property of the characteristic. When the characteristic is integrated at every time-space point (t,x), the voice characteristic is not formed macroscopically only at the specific time-space point, but formed stable throughout the wide (in particular in time) range though differing slightly.

Thus, because of the emphasis and the stabilization by the blurring processing, classification of vocal sound and normalization of the speaker can be effected more accurately than the past.

The above and further objects and features of the invention will more fully be apparent from the following detailed description with accompanying drawings.

BRIEF DESCRIPTION OF THE DRAWINGS

FIG. 3 is a schematic view of a time-space pattern, FIG. 4 is a schematic view of a normalized time-space pattern, FIGS. 10 through 15 are explanatory views showing examples of a mask pattern.

DETAILED DESCRIPTION OF THE PREFERRED EMBODIMENTS

A method of voice characteristic extraction of the present invention will now be explained.

Figure 1:
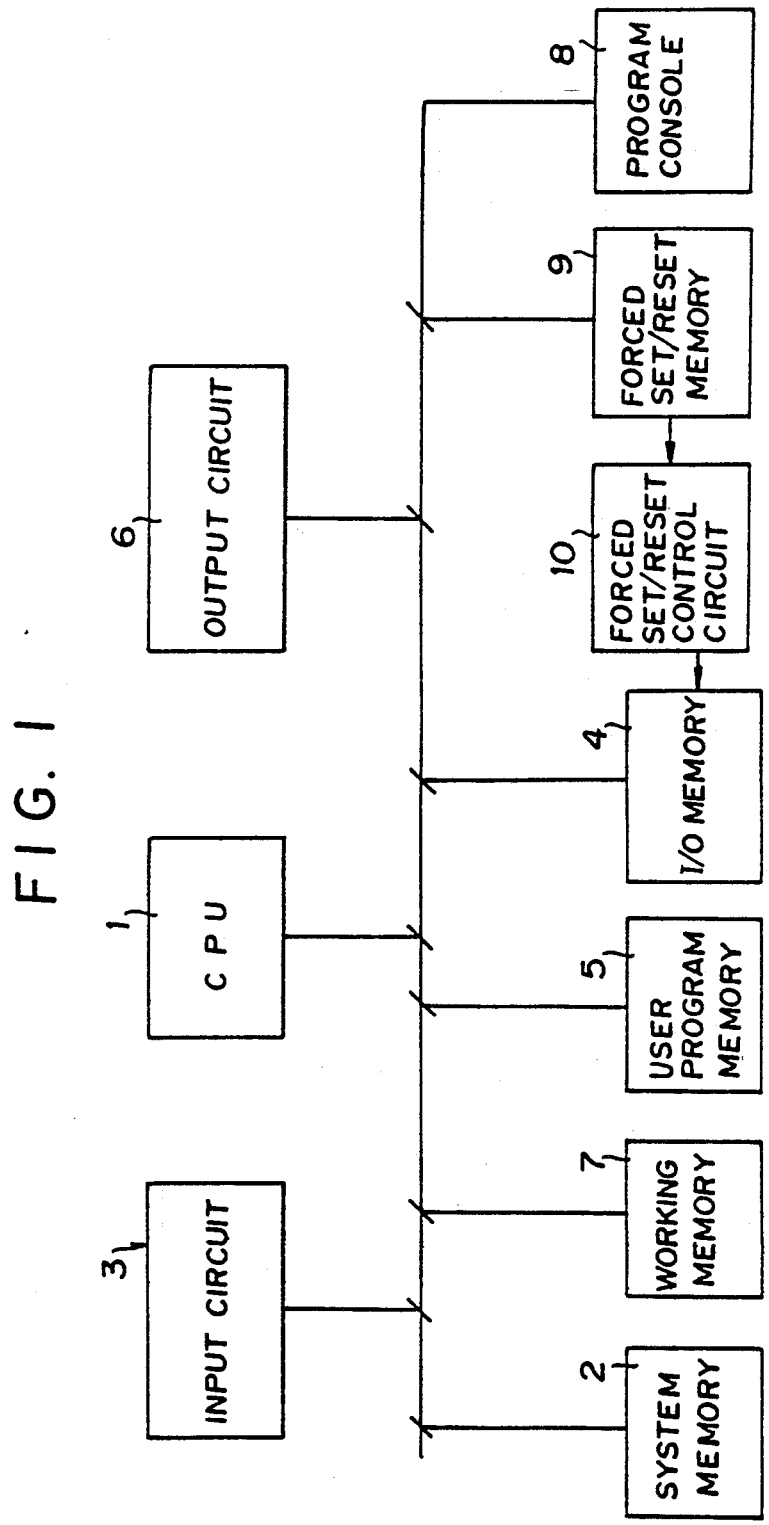
FIG. 1 is an explanatory view of a characteristic expressing apparatus in a time-space point (t,x), of the prior art.
Figure 2:
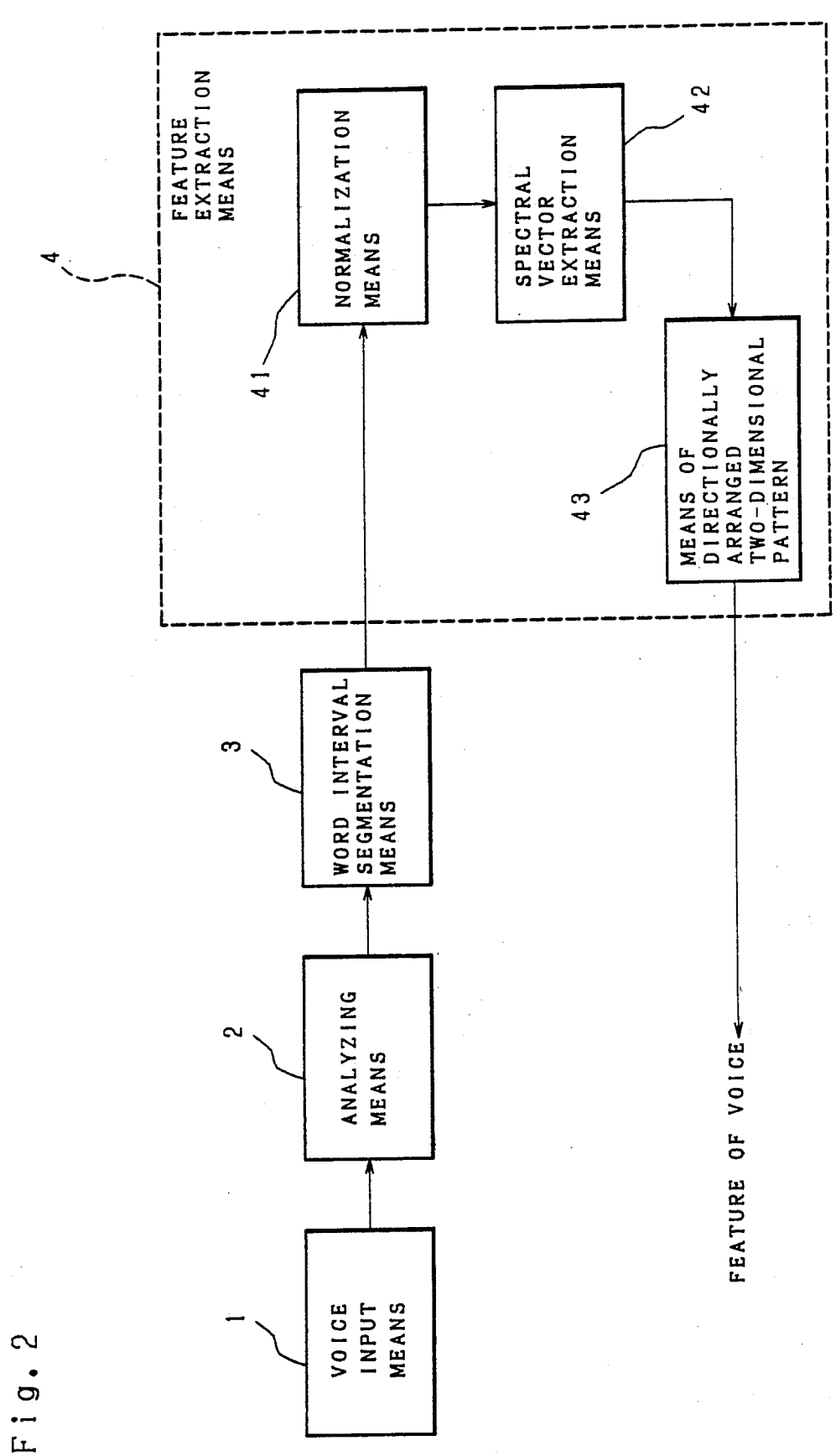
FIG. 2 is a block diagram showing the configuration of an apparatus for embodying a method of characteristic extraction of voice of the present invention.

FIG. 2 is a block diagram showing the configuration of an apparatus for embodying a method of the present invention.

In this embodiment, the voice signal is subjected to spectrum analysis in an analyzing means 2. As a time-space pattern of a scalar field, a spectrum having a space axis as a frequency axis is used.

Input of voice for forming the standard pattern or input of voice as the recognition object is effected by a voice input means 1 consisting of a voice detector such as a microphone and an A/D converter. The voice signal thus obtained is inputted to the analyzing means 2 comprising a band filter of a plurality of channels (e.g. 10~30) each having a different passing frequency band connected in parallel. As a result of analysis in the analyzing means, the time-space pattern is obtained. This is divided into each word in the recognition unit by a word interval segmentation means 3 and provided to a voice characteristic or feature extraction means 4. As the word interval segmentation means 3, the conventional devices may be used.

As the analyzing means 2 for dividing the voice signal for every frequency band, in the following description a group of band-pass filters will be used, but a high-speed Fourier transformer may be also be used.

The present invention is characterized by a voice characteristic of feature extraction means described hereinunder. The input pattern to the feature extraction means 4 is the time-space pattern having abscissas as the time axis and ordinates as the frequency axis, the time-space pattern segmented by the word interval segmentation means 3 and shown in FIG. 3 is designated as f(t,x), where t is a number showing the sampling time, x is a number specifying the channel number of the bandpass filter or frequency band ($1 \leq t \leq T$, $1 \leq x \leq L$, where T, L is a maximum value of t, x).

The output of word interval segmentation means 3 is inputted to a normalization means 41 of the feature extraction means 4. The normalization means 41 performs the linearlization of the time axis. This is intended for absorbing the length of word or input voice to some degree. The time axis is the frames from T to M (e.g. around 16~32 frames). More specifically, when $M \leq T$, the normalized time-space pattern F(t,x) can be obtained by the following equation as calculating t from 1 to M.

$$F(t,x) = \sum_{i=(T/M)\cdot(t-1)+1}^{(T/M)\cdot t} f(i,x)/(T/M) \quad (1)$$

where, $1 \leq t \leq M$ and, when $M > T$, $$F(t,x) = f(j,x) \quad (2)$$

where, $j = [(T/M)\cdot t]$ here, [ ] denotes a Gaussian symbol.

FIG. 4 shows the time-space pattern F(t,x) normalized by the processing aforementioned.

Though this embodiment is for the linear normalization, when performing non-linear normalization, the spectrum field of f(t,x) may be obtained by the method to be described latter and using vector field density equalization in which the vector field density is fixed.

The normalized time-space pattern is subjected to extraction of the spectral vector field in a spectral vector extraction means 42 in a following manner. The spectral vector field is calculated by using the value in the vicinity of each lattice point (t,x) of the normalized time-space pattern as shown in Table 1.

TABLE 1

| F(t − 1, x − 1) | F(t, x − 1) | F(T + 1, x − 1) |

TABLE 1-continued

| F(T−1,x) | F(t,x) | F(t + x,x) |
|---|---|---|
| F(t − 1,x + 1) | F(t,x + 1) | F(t + 1,x + 1) |

$$X = F(t + 1,x + 1) + 2F(t + 1,x) + F(t + 1,x - 1) - \quad (3)$$
$$F(t - 1,x + 1) - 2F(t - 1,x) - F(t - 1,x - 1)$$

$$Y = F(t - 1,x + 1) + 2F(t,x + 1) + F(t + 1,x + 1) - \quad (4)$$
$$F(t - 1,x - 1) - 2F(t,x - 1) - F(t + 1,x - 1)$$

$$r = \sqrt{X^2 + Y^2} \quad (5)$$

$$\theta = \tan^{-1} \frac{Y}{X} \quad (6)$$

The spectral vector field pattern is shown by S(r,θ).

Referring to equations (3)~(6), X is the value obtained by emphasizing the increment along the time axis of object data along the frequency axis and may be designated as a differential value along the time axis. Similarly, Y may be designated as the differential value along the frequency axis on the variable index along the frequency axis.

In the vector field of the orthogonal coordinates of these two indexes, r represents the quantity of vector and θ represents the direction thereof.

Figure 5:
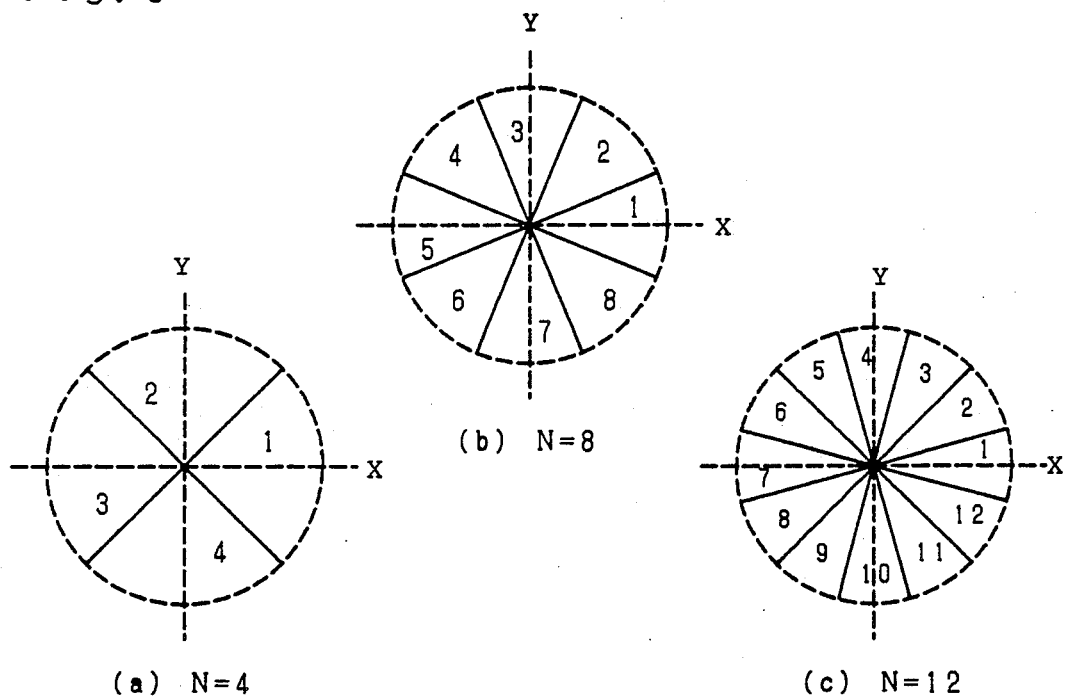
FIGS. 5 and 6 are explanatory views of vector orientation quantization.

Next, from the spectral vector field pattern S(r,θ) the directionally arranged two-dimensional pattern is formed in a forming section of directionally arranged two-dimensional pattern 43. That is, first, for the vector in all lattice points of the vector field pattern, its orientation parameter θ is quantized to a value N. Now, a decision of an optimum quantization orientation number N when forming the orientation pattern of the spectral vector field will be considered. As shown in "A New Approach for the Segmentation and the Phonemic Feature Extraction from Continuous Speech Based on the Vector Field Model", R. Oka, Transaction of the Committee on Speech Research, The Acoustical Society of Japan, S83-10 (May 25, 1983), when taking into consideration of the fact that the spectral vector field exhibits normal, increased, and decreased time-space phases of the spectral power, N is set at three cases 4,8,12 as shown in FIG. 5 to select the optimum value by the recognition test. Open recognition test with respect to the speaker is carried out, in which 9 out of 10 males are selected to prepare the standard pattern for repeating 10 recognition tests to recognize the rest. Though the orientation pattern must be used as the characteristic feature pattern, blurring processing is not performed. The recognition result of the test in which N takes the different cases of 4,8 and 12 is shown in Table 2. From the recognition result in Table 2, N may be decided at about 8 in this recognition condition (open speaker recognition of 53 words spoken by 10 males).

TABLE 2

| N = 4 | N = 8 | N = 12 |
|---|---|---|
| 93.77 | 94.34 | 93.59 |

Figure 6:
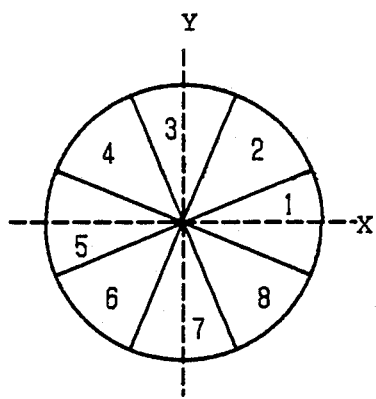

FIG. 6 is an explanatory view illustrating an example of quantization when N=8. θ and N correspond to each other as shown in Table 3.

TABLE 3

| θ° (degree) | N |
|---|---|
| 337.5~360 | 1 |
| 0~22.5 | |
| 22.5~67.5 | 2 |
| 67.5~112.5 | 3 |
| 112.5~157.5 | 4 |
| 157.5~202.5 | 5 |
| 202.5~247.5 | 6 |
| 247.6~292.5 | 7 |
| 292.5~337.5 | 8 |

Figure 7:
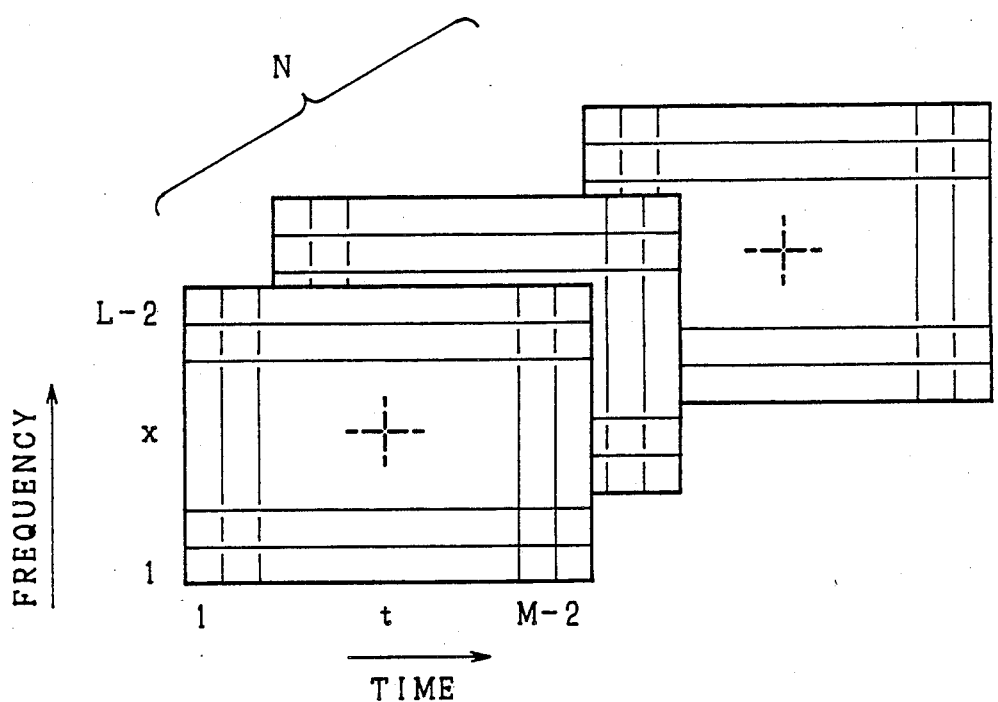
FIG. 7 is a schematic view of a directionally arranged two-dimensional pattern.

Next, from the vector of all lattice points, the vectors having the same value N, which is the directional quantization value, are separated for each value N and taken out to form the N directionally arranged two-dimensional patterns H(t,x,Θ). Each of the patterns H respectively has its vector quantity as the value of each lattice point. FIG. 7 is a schematic view of the directionally arranged two-dimensional pattern, in which r exists only in the position to which the value N is applicable and the other position is 0. As it will be understood from the equations (3), (4), for the vicinity of 8 it is necessary to calculate X, Y, S(r,θ). It is not calculated as to columns t=1, t=M and lines x=1, x=L in FIG. 4. Thus, in the directionally arranged two-dimensional pattern H(t,x,Θ), the direction of time axis becomes column M−2 and the direction of frequency axis becomes line L-2.

The value of N is not limited to 8.

The directionally arranged two-dimensional pattern H(t,x,Θ) thus obtained is the feature pattern extracted by the method of present invention, which may be used as matching pattern information in the voice recognition.

Figure 8:
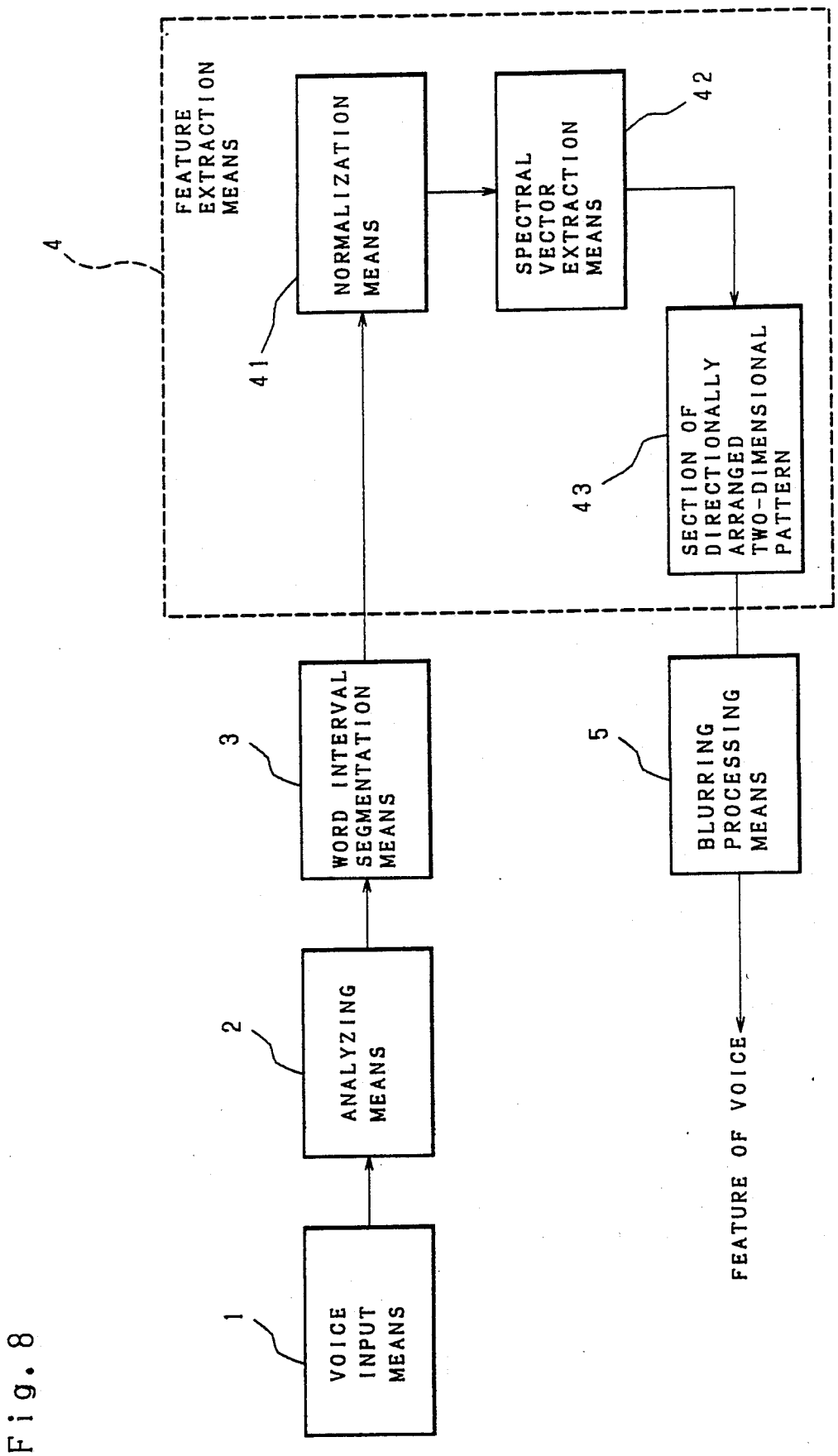
FIG. 8 is a block diagram showing the configuration of an apparatus for embodying a method of voice characteristic extraction of the present invention.

Though a high recognition rate can be obtained from this pattern information to be described later, the higher recognition rate can be obtained by providing the directionally arranged two-dimensional pattern H(t,x,Θ) to a blurring processing means 5 for blurring processing as shown in FIG. 8.

The blurring processing is effected by multiplying the mask pattern in the 3×3 mask pattern, which is emphasized in response to its position, to the pattern to be processed and when the directionally arranged two-dimensional pattern after blurring processing is designated as Ĥ(t,x,Θ), it may be expressed by the following equation, $$\hat{H}(t,x,\Theta) = \sum_{j=0}^{8} \omega_j \cdot H(t + \alpha_j, x + \beta_j, \Theta) \quad (7)$$

Here, $w_j$ (j=0, 8) designates the emphasized value at each position in the 3×3 mask pattern of blurring processing and having a value as shown hereinunder in (8), (9). The position having $w_0$ in the center corresponds to that of the processing object data of the directionally arranged two-dimensional pattern and each position having $w_1$ to $w_8$ to eight positions surrounding the processing object data of the directionally arranged two-dimensional pattern respectively.

$$\begin{array}{|c|c|c|} \hline \omega_4 & \omega_3 & \omega_2 \\ \hline \omega_5 & \omega_0 & \omega_1 \\ \hline \omega_6 & \omega_7 & \omega_8 \\ \hline \end{array} = \begin{array}{|c|c|c|} \hline 0 & 0 & 0 \\ \hline 9 & 15 & 9 \\ \hline 0 & 0 & 0 \\ \hline \end{array} \quad (8)$$

frequency ↑ time →

$$\begin{array}{|c|c|c|} \hline \omega_4 & \omega_3 & \omega_2 \\ \hline \omega_5 & \omega_0 & \omega_1 \\ \hline \omega_6 & \omega_7 & \omega_8 \\ \hline \end{array} = \begin{array}{|c|c|c|} \hline 1 & 2 & 1 \\ \hline 9 & 15 & 9 \\ \hline 1 & 2 & 1 \\ \hline \end{array} \quad (9)$$

frequency ↑ time →

$(\alpha_j, \beta_j)$, $j=(0 \sim 8)$, all as shown in Table 4.

TABLE 4

| j | $(\alpha_j, \beta_j)$ |
|---|---|
| 0 | (0, 0) |
| 1 | (1, 0) |
| 2 | (1, 1) |
| 3 | (0, 1) |
| 4 | (−1, 1) |
| 5 | (−1, 0) |
| 6 | (−1, −1) |
| 7 | (0, −1) |
| 8 | (1, −1) |

This $(\alpha_j, \beta_j)$ specifies the position of object data to which $\omega_0$ is responded, and that of the data in the vicinity of 8 to which $\omega_1 \sim \omega_8$ are responded respectively.

The meaning of the equations (8), (9) is to perform the blurring processing along the time axis more positively than the blurring processing along the frequency axis.

When used in the voice characteristic extraction for either male or female, the blurring processing along the frequency axis is not performed as in the equation (8) and when the voice characteristic extraction for both male and female is performed, the blurring processing along the frequency axis is slightly performed as the equation (9).

The voice characteristic extracted from the blurring processing has less variation of the inherent characteristic of voice. Namely, the time-space variation of the characteristic caused by the different speakers and speaking rates is stabilized. Thus, when this is used as the standard pattern or non-recognition pattern, the voice recognition rate can be improved.

However, the orientation characteristic is basically integrated in the time interval so that integration in the space interval must be extremely reduced to obtain the voice characteristic showing a good vocal sound. This is caused by the fact that the magnitude of physiological restriction of phonetic organs differs from those of the dynamic variation itself due to vocal sound in the voice pronunciation. Since the former is stronger than the latter, force of propagation of the orientation feature in the space axis is close to 0 between the same sex, and though not 0 but extremely small between the opposite sex.

Thus, in the case of same sex, the blurring processing is performed only along the time axis, and in the case of both sexes, in addition to the aforesaid processing the blurring processing along the frequency axis is performed a little.

Though the blurring processing is preferably repeated for several times in accordance with the equation (7), in the case of single sex, blurring processing having the blurring effect only of the time axis is suitably carried out for 4~8 times as shown in the equation (8). In the case of both sexes, blurring processing of the time-space having the weight of space axis of about $\frac{1}{4} \sim 1/10$ of the weight of blurring on the time axis at the same time is repeated for about 4 times respectively as shown in the equation (9).

Figure 9:
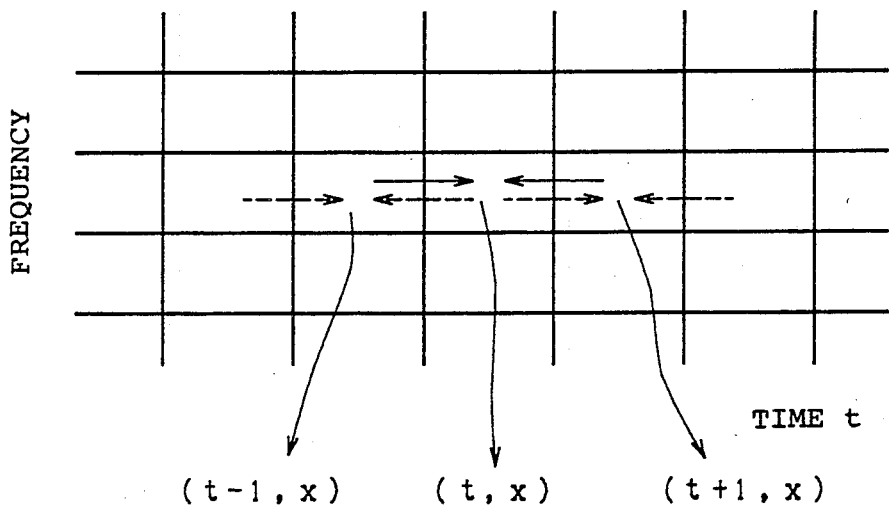
FIG. 9 is an explanatory view of blurring processing.

Meanwhile, when the mask pattern is used to perform the first blurring processing, information of the lattice points (t−1,x) and (t+1,x) are inputted to the lattice point (t,x) and (t,x) are inputted to the lattice point (t−1,x), and information of (t,x) and (t+2,x) to the lattice point (t+1,x). FIG. 9 is a schematic view showing this processing. Thus, when the second blurring processing is performed, information of the lattice point (t−1,x) including the orginal information of the lattice point (t−2,x) an information of the lattice point (t+1,x) including the original information of the lattice point (t+2,x) are inputted. Therefore, when the blurring processing is performed for 4 times, information of the lattice points (t−4,x)~(t+4,x) are inputted to the lattice point (t,x). In this case, an emphasizing coefficient is naturally multiplied to each information.

Figure 10:
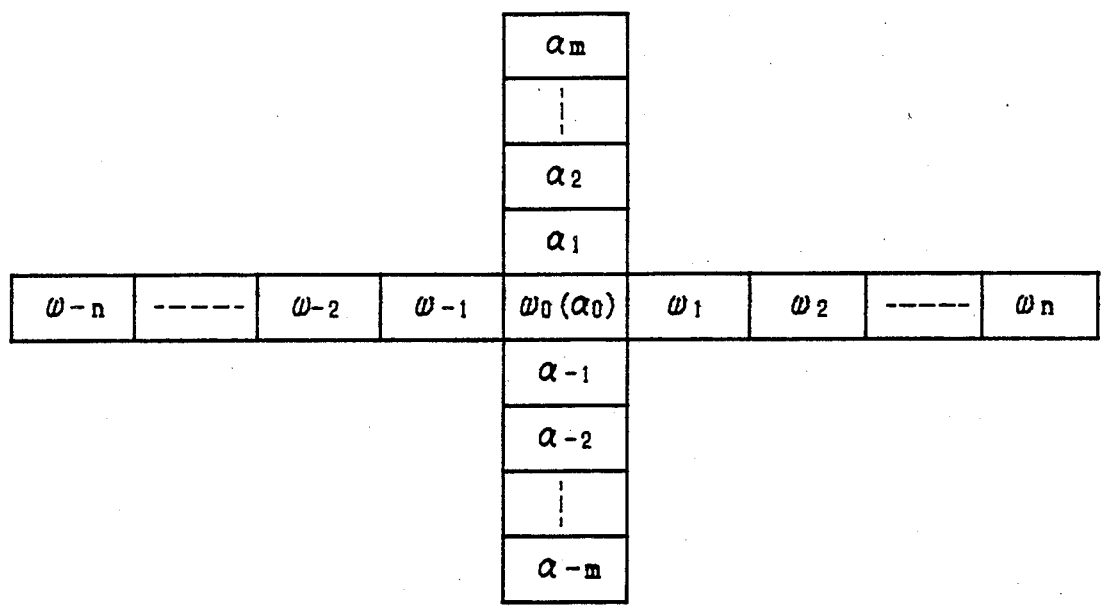

FIG. 10 shows a mask pattern in which a result substantially same as a number of blurring processings as aforementioned is obtained by one blurring processing. As same as the above pattern, a value, obtained by dividing the accumulation of the product of the set point of each lattice point and that of the mask pattern value by the sum of set points of the mask pattern, is decided to be the lattice point which is subjected to the blurring processing.

That is, $$\hat{H}(t,x,\Theta) = \frac{1}{A} \left( \sum_{j=-n}^{n} \omega_j \cdot H(f+j,x,\Theta) + \sum_{k=-m}^{m} \alpha_k \cdot H(t,x+k,\Theta) - \alpha_0 H(f,x,\Theta) \right) \quad (10)$$

Where, $\begin{cases} A = \sum_{j=-n}^{n} \omega_j + \sum_{k=-m}^{m} \alpha_k - \alpha_0 \\ \alpha_0 - \omega_0 \end{cases}$ When performing blurring processing only for the time axis as described above, or when the extraction object is only the same sex, the emphasized mask pattern (m=0, n=4; shown in FIG. 11) is used. In this method, by performing one blurring processing, information of 4 lattice points on the both sides are inputted at one time to the lattice point to be blurred. Thus, effects equivalent to 4 blurring processings of the previous method can be obtained. Thus, a high-speed operation as well as saving of hard wares can be accomplished. In addition, when the mask pattern which is not emphasized (shown in FIG. 12) is used in approximation, substantially the same effect is obtained and the operation is more simplified. When blurring processing for the space axis is also performed as the equation (9) or both sexes are subjected to extraction, the mask pattern emphasized as shown in FIG. 13 may be used (m≠0, e.g. m=1, n=4). In this case, the approximate mask pattern which is not emphasized as shown in FIG. 14 may be used to obtain the same effect. Furthermore, the mask pattern which is emphasized only along the space axis as shown in FIG. 15 may also be used.

Figure 16:
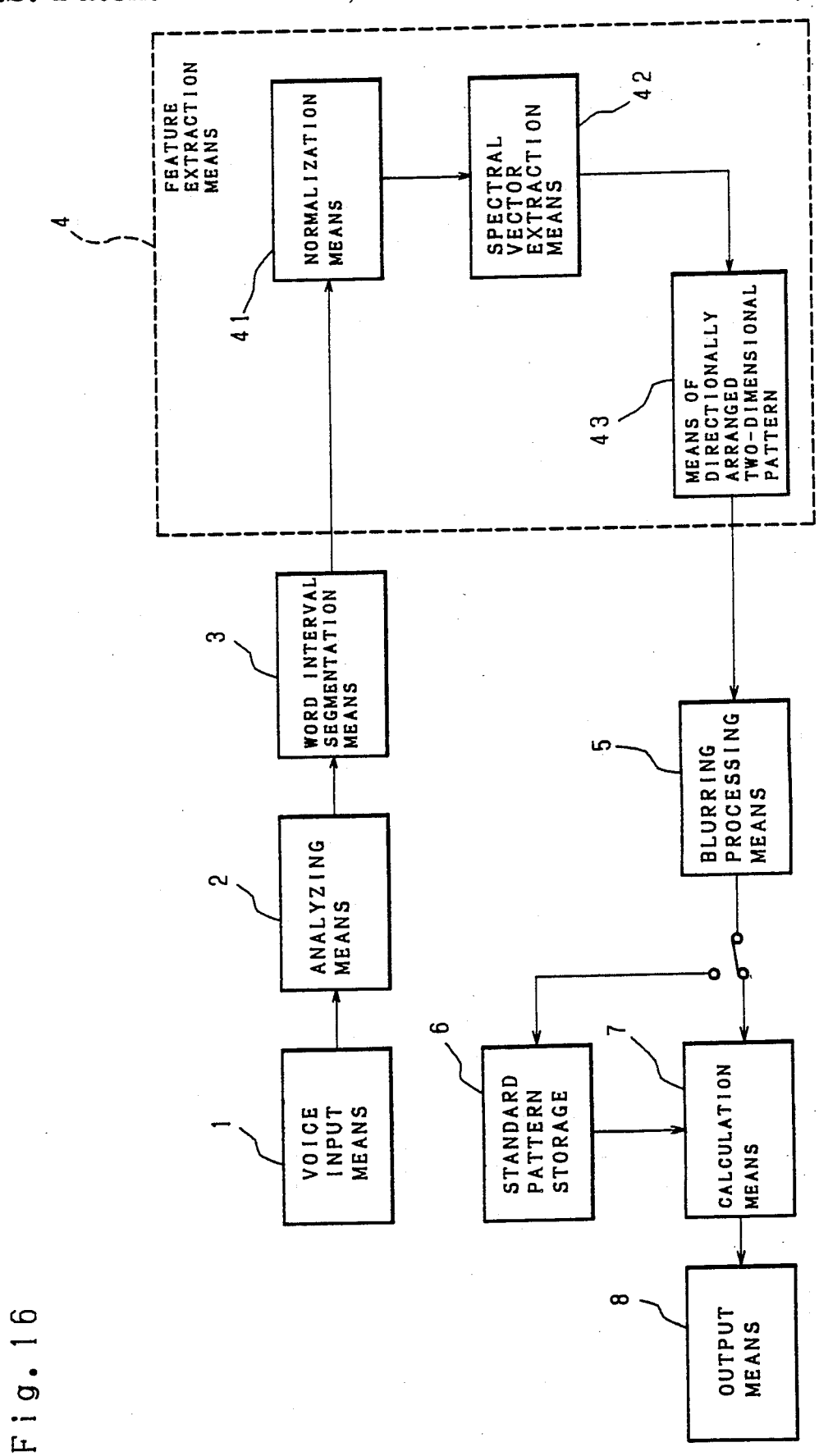
FIG. 16 is a block diagram of a voice recognition apparatus according to the present invention.

FIG. 16 is a block diagram showing a voice recognition apparatus of words in accordance with the linear matching embodying the present invention, in which parts corresponding to FIG. 2 are identified by the same reference character.

The analyzing means 2 comprises a band-pass filter of 20 channels, and the normalization means 41 performs linear normalization to 32 frames (frame distance: 8 m/sec.) with respect to the time axis (N=8).

Features extracted with respect to various words in advance are stored as the standard pattern in the standard pattern storage 6 together with the data specifying thereof. At recognition, correlation or distance calculation is performed respectively on the output from the blurring processing means 5 and the standard pattern in the standard pattern storage 6 in the calcualtion means 7. The data which specifies the standard pattern of maximum correlation value or minimum distance value is outputted as the result of recognition.

When deciding the standard pattern, input is made several times for one word to repeat procesing aforementioned and its average value is stored in the standard pattern storage 6.

The standard pattern is assumed as Ii(t,x,Θ); i is the number specifying a word, correlation $\rho(I.\hat{H})$, with the output of blurring processing means 5 given to the calculation means 7; at the recognition of input voice, is calculated according to the following equations (11), (12), $$K_\Theta = \frac{\sum_{t=1,x=1}^{M-2,L-2} Ii(t,x,\Theta) \cdot \hat{H}(t,x,\Theta)}{\sqrt{\sum_{t=1,x=1}^{M-2,L-2} (Ii(t,x,\Theta))^2} \cdot \sqrt{\sum_{t=1,x=1}^{M-2,L-2} (H(t,x,\theta))^2}} \quad (11)$$

$$\rho(I \cdot \hat{H}) = \frac{1}{N} \sum_{\Theta=1}^{N} K_\Theta \quad (12)$$

Then, the word corresponding to Ii(t,x,Θ) showing the maximum correlation value $\rho$ is outputted from the output means 8 of the CRT display or the like.

In the calculation means 7, the distance $D(I,\hat{H})$ between the standard pattern Ii(t,x,Θ) and the recognition object pattern $\hat{H}(t,x,\Theta)$ may be calculated according to the following equation.

$$D(I,\hat{H}) = \sum_{\Theta=1}^{8} \sum_{t=1,x=1}^{M-2,L-2} |Ii(t,x,\Theta) - \hat{H}(t,x,\Theta)| \quad (13)$$

A word corresponding to the standard pattern of minimum distance is outputted as the input word.

Figure 17:
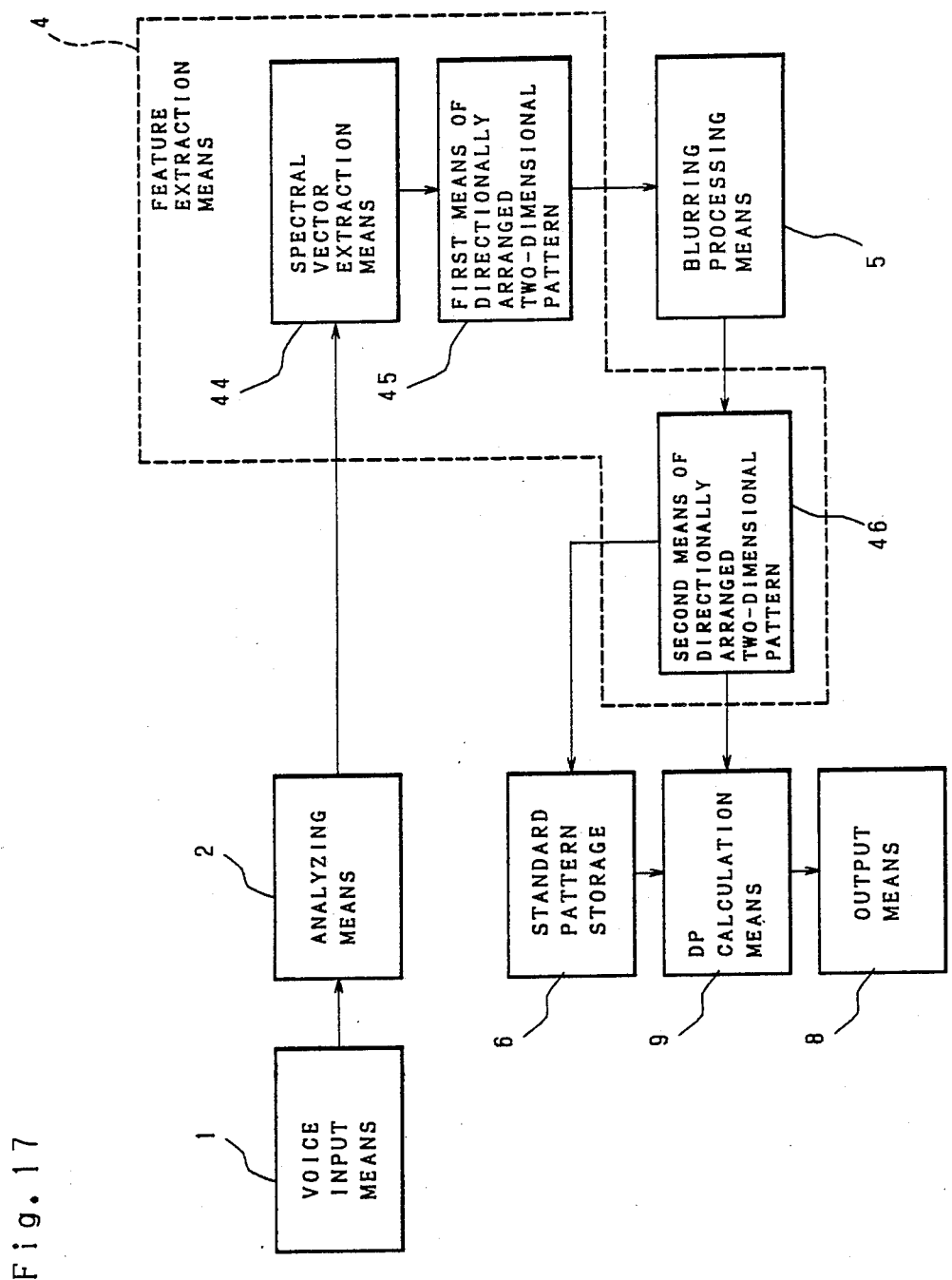
FIG. 17 is a block diagram showing another embodiment of the present invention.

In the embodiment described as above, though the linear matching has been performed, the non-linear matching by DP matching is also possible by the apparatus shown in FIG. 17.

Figure 18:
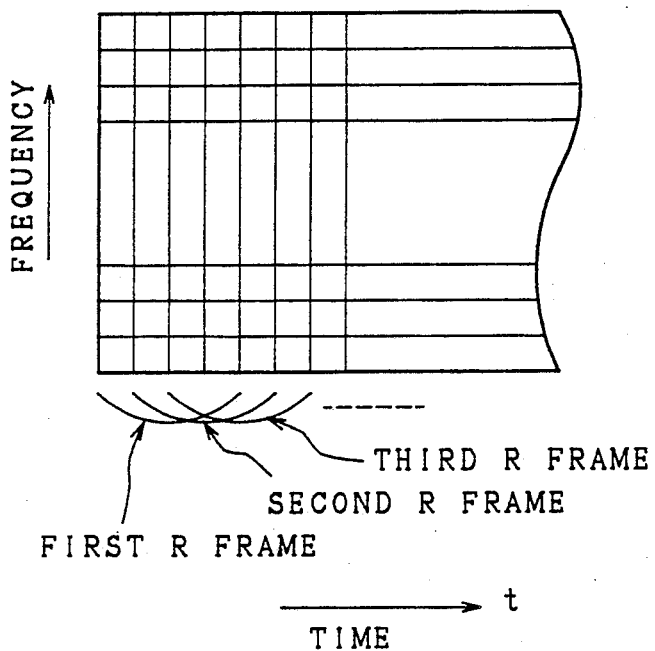
FIG. 18 is an explanatory view of a method of extraction of a spectral vector field of an R frame.

As same as the apparatus shown in FIG. 16, the voice signal inputted to the voice input means is divided for every frequency band by the analyzing portion 2, and the time-space pattern f(t,x) is extracted successively along the time axis t to be inputted to teh feature extraction means 4. The time-space pattern f(t,x) which is extracted successively is the same as that shown in FIG. 3, but in an extraction means 44, in parallel to the extraction, the spectral vector field $S(r,\theta)$ is extracted successively similarly as described before for every R(R≧3) frame along the time axis as shown in FIG. 18 to be provided to a first forming means of directionally arranged two-dimensional pattern 45.

The first forming means of directionally arranged two-dimensional pattern 45, forming the directionally arranged two-dimensional pattern with respect to the spectral vector field $S(r,\theta)$ corresponding to the R-2 frame as same as before, provides it to the blurring processing means 5, performs blurring processing by the same blurring processing method as before, and provides it successively to a second forming means of directionally arranged two-dimensional pattern 46.

In the second forming means of directionally arranged two-dimension pattern 46, an average value of the spectral vector field or the spectral vector field at one typical point is selected to decide it as the directionally arranged two-dimensional pattern for one frame. Namely, when R=3 the directionally arranged two-dimensional pattern is formed for one frame only so that there is no choice. However, when R≧4 since the directionally arranged two-dimensional pattern for a plurality of frames are obtained along the time axis, these may be averaged or either one may be selected.

Figure 19:
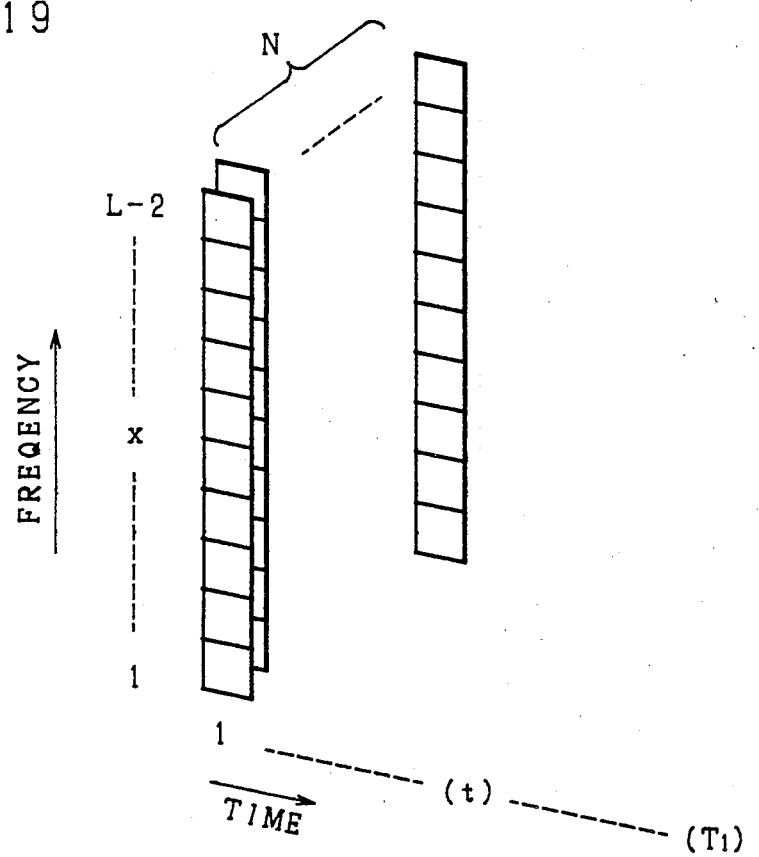
FIG. 19 is a schematic view of a directionally arranged two-dimensional pattern of a frame.

FIG. 19 shows the directionally arranged two-dimensional pattern for one frame obtained in such a manner.

The directionally arranged two-dimensional pattern $[1,T_i]$ in the time means obtained by performing such processing successively may be expressed in the equation (14) as a group.

$$I = \{f_\Theta(t,x) : 1 \leq \Theta \leq N, 1 \leq t \leq T_i, 1 \leq x \leq L-2\} \quad (14)$$

Where, similarly as before
Θ = direction of quantized vector field
t = frame
x = channel number of band-pass filter As the standard pattern A to be stored, plural 1 is obtained by inputting the voice for several times with respect to each word, and setting a response point by applying the DP matching to perform average processing thereafter, but it may also be formed by the same method without using the DP matching.

$$A = \{z_\Theta(\tau,x) : 1 \leq \Theta \leq N, 1 \leq \tau \leq T_R, 1 \leq x \leq L-2\} \quad (15)$$

Where,
$T_R$ is the frame length.

Figure 20:
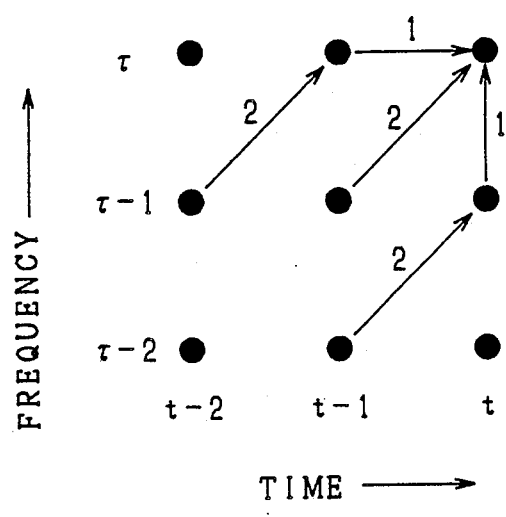
FIG. 20 is an explanatory view of a DP matching path.

When recognizing the input voice, DP matching is performed on the output I of the second forming means of directionally arranged two-dimensional pattern 47 and the standard pattern A in the DP calculation means 9. Cumulative distance D(A,I) can be obtained as the equation (15) by defining d(t,τ) by the equation (16):

$$d(t,\tau) = 1 - \frac{\sum_{\Theta=1}^{8} \sum_{x=1}^{L-2} f_\Theta(t,x) z_\Theta(\tau,x)}{\sqrt{\sum_{\Theta=1}^{8} \sum_{x=1}^{L-2} (f_\Theta(t,x))^2} \cdot \sqrt{\sum_{\Theta=1}^{8} \sum_{x=1}^{L-2} (z_\Theta(\tau,x))^2}} \quad (16)$$

and calculating the gradual equation (17) by a usual DP taking into account of the matching path as shown in FIG. 20:

$$S(1,1) = d(1,1)$$

-continued $$S(t,\tau) = \min \begin{Bmatrix} S(t-2,\tau-1) + 2d(t-1,\tau) + d(t,\tau) \\ S(t-1,\tau-1) + 2d(t,\tau) \\ S(t-1,\tau-2) + 2d(t,\tau-1) + d(t,\tau) \end{Bmatrix} \quad (17)$$

Where, min shows the minimum value of 3 equations in {} on the right-hand side.

$$D(A,I) = \frac{S(T_I,T_R)}{T_R + T_I - 1} \quad (18)$$

It is also possible to apply continuous DP different from the embodiment described as above. This has been disclosed by one of the present inventors in "Continuous Words Recoginition by Use of Continuous Dynamic Programming for Pattern Matching", Transactions of the Committee on Speech Research, The Acoustic Society of Japan, S78-20 (Jun. 24, 1978) in which matching of the frame features with the standard pattern is performed in spots simultaneously as extracting the former successively.

In this method, the local distance $d(t,\tau)$ is calculated by the equation (13) for every frame being inputted to the DP calculation means 9 by the second forming means of directionally arranged two-dimensional pattern 46, and the following gradual equation of continuous DP is also calculated for every frame input.

$$P(-1,\tau) = P(0,\tau) = \infty \ (1 \leq \tau \leq T)$$

$$P(t,\tau) = \min \begin{Bmatrix} P(t-2,\tau-1) + 2d(t-1,\tau) + d(t,\tau) \\ P(t-1,\tau-1) + 3d(t,\tau) \\ P(t-1,\tau-2) + 3d(t,\tau-1) + 3d(t,\tau) \end{Bmatrix} \quad (19)$$

The cumulative distance D(t) is given for every frame input time as, $$D(t) = P(t,T)/3T \quad (20)$$

Where, T is frame length. Namely, recognition processing can be proceeded at real time by the continuous DP.

The matching path in the continuous DP is different from that shown in FIG. 20, and its details must be referred to the reference described as above. From the pattern at the stage where the directionally arranged two-dimensional pattern is obtained, a method of extracting the "cell features" for recognition, shown in "Recognition of Handwritten Chinese*-Japanese Characters by Using Cellular Features, Japan Electrotechnical Laboratory, Report No. 834", may be considered.

Figure 21:
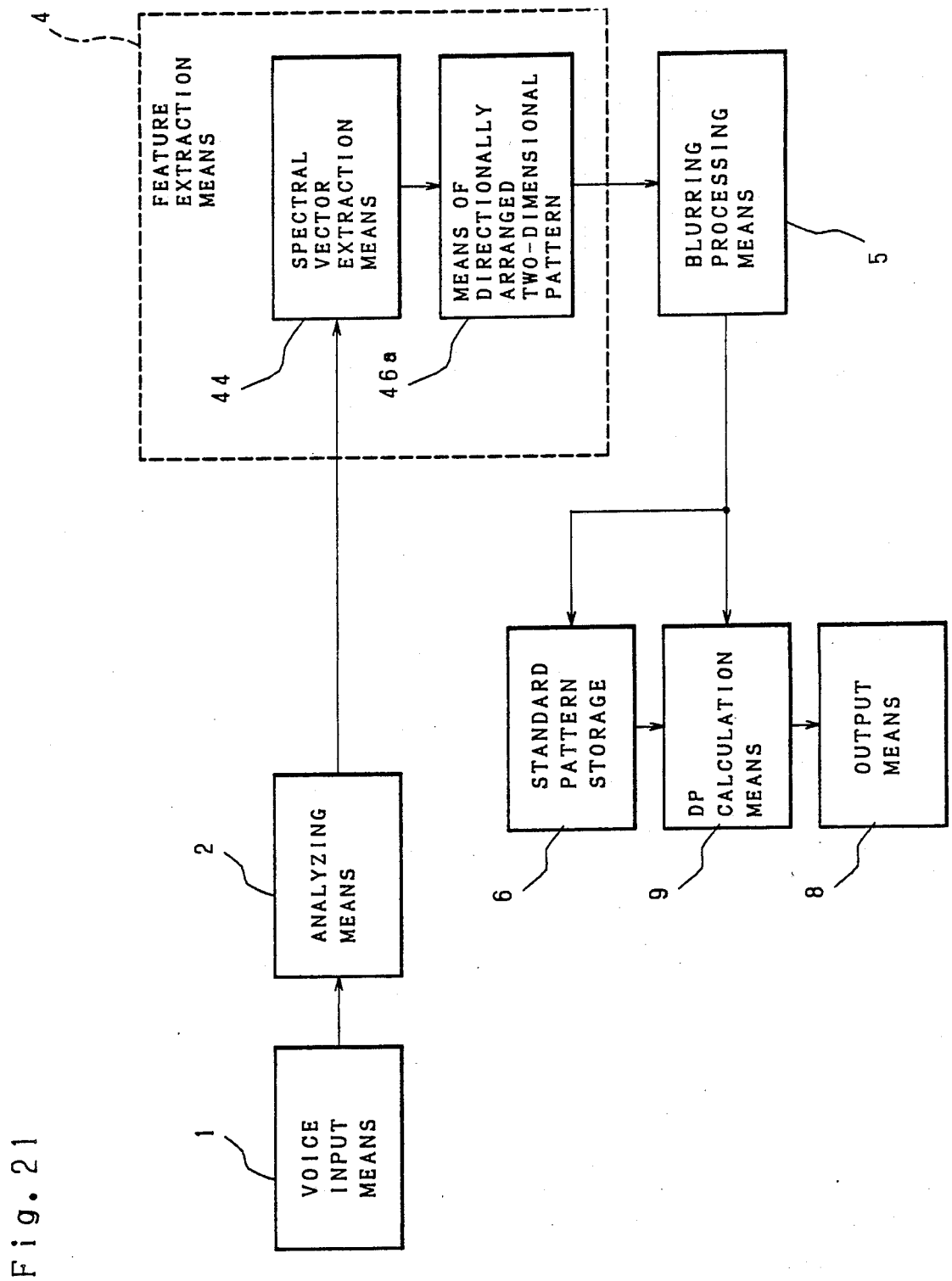
FIG. 21 is a block diagram showing another embodiment of the present invention.

FIG. 21 differs from the embodiment of FIG. 17 in that, the spectral vector field $S(r,\theta)$ obtained in the spectral vector field extraction means 44 is provided to thr forming means of directionally arranged two-dimensional pattern 46. Also, the directionally arranged two-dimensional pattern obtained therein is provided to the blurring processing means 5 for blurring processing, providing the blurring processing pattern to the standard pattern storage means 6 and DP calculation means 9.

The forming means of a directionally arranged two-dimensional pattern serves the function same as the first forming means of directionally arranged two-dimensional pattern 45 of the embodiment of FIG. 17 when R=3, whereas it serves two functions of the first and second forming means of directionally arranged two-dimensional pattern 45, 46 of the embodiment of FIG. 17 when $R \geq 4$.

Advantages of the present invention will now be described. In the present invention, the recognition is performed by the patterns of different direction of vector field, and voice recognition is performed by 4 methods consisting of linear matching DP matching methods, and is compared with the result of conventional spectral recognition (both the linear and DP matching). The blurrihng processing was performed according to the patterns of (8) and (9). The open test was carried out under such recognition condition and the following conditions. One pattern was set for one word.

(a) 9 out of 10 males were selected to prepare the standard pattern and the method of recognizing the rest was repeated for 10 persons. (speakers open recognition test of 10 males×53 words)

(b) 9 out of 10 females were selected to prepare the standard pattern and the method of recognizing the rest was repeated for 10 persons. (speakers open recognition test of 10 females×53 words)

(c) 19 out of 10 males and 10 females were selected to prepare the standard pattern and the method of recognizing the rest was repeated for 20 persons. (speakers open recognition test of 20 males, females×53 words)

Results are shown in Table 5.

TABLE 5

| | Recognition Features and Methods | | | | | |
|---|---|---|---|---|---|---|
| | | | Different Directional Pattern of Vector Field | | | |
| | Spectrum | | Without Blurring | | With Blurring | |
| Speaker | Linear | DP | Linear | DP | Linear | DP |
| Between Same Sex | | | | | | |
| (a) Male | 95.66 | 98.87 | 95.28 | — | 99.43 | — |
| (b) Female | 93.77 | 97.64 | 94.15 | — | 97.36 | — |
| Between Two Sexes | | | | | | |
| (c) Male | 94.53 | 98.11 | 93.02 | 97.36 | 97.17 | 97.36 |
| Female | 91.51 | 94.53 | 90.57 | 94.45 | 96.04 | 96.23 |
| average | 93.02 | 96.32 | 91.80 | 95.90 | 96.61 | 96.80 |
| Calculation Time | 1 | 850 | 7.5 | 3000 | 8.3 | 3060 |

The recognition object of the test described above is word. When the recognition object is single syllable or phoneme, the recognition results by this invention without blurring processing, are superior to the conventional method.

In consequence, in case of the present invention, the same effect as the conventional method can be obtained without blurring, whereas with blurring in case of the linear matching no difference is seen as to the recognition rate as compared with the case of spectrum plus DP matching, and the calculation time (CPU time) of the present invention is shorter than the conventional method, thus it is profitable for realization as hardware.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. A method of determining characteristic of a voice signal comprising the steps of:

analyzing the signal in time and space to produce a scalar time-space field pattern lattice with time as one axis and space as the other axis from which the characteristic is to be determined with each lattice point corresponding to a point of the time space analysis, converting each point of the time space field pattern lattice into a vector having a quantity parameter and an angular orientation parameter to form a vector field pattern lattice, quantizing the angular orientation parameter of the vector at each point of the vector field pattern lattice into one of N groups (wherein N is an integral number) with each of the N groups corresponding to a certain angular range of the vector angular orientation parameter, and forming N two dimensional orientation pattern lattices, each corresponding to one of the N groups of angular orientation quantization of the vectors of the vector field pattern, the lattice point of each of said N two dimensional orientation pattern lattices having the vector quantity parameter of the point of the vector field pattern lattice of the corresponding angular orientation range.

2. A method as claimed in claim 1, wherein said space axis is a frequency axis.

3. A method as in claim 1 further comprising the step of determining a voice characteristic from the N two dimensional orientation pattern lattices.

4. A method of a characteristic of a voice signal comprising the steps of:

analyzing the signal in time and space to produce a scalar time-space field pattern lattice with time as one axis and space as the other axis from which the characteristic is to be determined with each lattice point corresponding to a point of the time space analysis, converting each point of the time space field pattern lattice into a vector having a quantity parameter and an angular orientation parameter to form a vector field pattern lattice, quantitizing the angular orientation parameter of the vector at each point of the vector field pattern lattice into one of N groups (where N is an integral number) with each of the N groups corresponding to a certain angular range of the vector angular orientation parameter, forming N two dimensional orientation pattern lattices, each corresponding to one of the N groups of angular orientation quantization of the vectors of the vector field pattern, the lattice point of each of said N two dimensional orientation pattern lattices having the vector quantity parameter of the point of the vector field pattern lattice of the corresponding angular orientation range, performing blurring processing of said two dimensional orientation pattern lattices with respect to at least one of the time and space axes to form a plurality of blurred process patterns corresponding to the two dimensional orientation pattern lattices, and determining the voice characteristic from said blurring processed pattern.

5. A method as claimed in claim 4, wherein said space axis is a frequency axis.

6. A method as claimed in claim 4, wherein the step of blurring processing is performed only for the time axis in case of extracting voice characteristics from only one sex.

7. A method as claimed in claim 4, wherein said blurring processing for the time axis is performed more positively than that for the space axis.

8. A method as claimed in claim 6, wherein said blurring processing along the space axis is performed more positively in the case of voice characteristic extraction for both male and female, compared with that for one sex.

9. A method as claimed in claim 4, wherein said blurring processing is a mask operation processing of a mask pattern which has a preset weight value of $3 \times 3$, comprising a center point corresponding to the lattice point.

10. A method as claimed in claim 8, wherein said mask operation is repeated for a plurality of times.

11. A method as claimed in claim 4, wherein said blurring processing is the processing of a mask pattern which, with respect to each lattice point of each two-dimensional orientation pattern, has a center point corresponding to each said lattice point, expands by more that two lattice points each in both directions of the time axis from said center point, and has a preset weight value.

12. A method as claimed in claim 11, wherein said weight values are all "1".

13. A method as claimed in claim 4, wherein said blurring processing is the processing of a mask pattern which, with respect to each lattice point of each two-dimensional orientation pattern, has a center point corresponding to said each lattice point, expands by more than two lattice points each in both directions of the time axis from each center point, expands by more than one lattice point each in both directions of the space axis from said center point, and has a preset weight value.

14. A method as claimed in claim 13, wherein said mask pattern expands more along the time axis than along the space axis.

15. A method as claimed in claim 13, wherein said weight values of the center point of said mask pattern and along the time axis are all "1", and that along the space axis is less than "1".

16. A method as in claim 4 wherein the step of blurring processing at a lattice point of a two-dimensional orientation pattern lattice is performed in both directions of the time and space axis relative to a said point.

17. A method of voice recognition comprising the steps of:

analyzing a voice signal inputted as a recognition object in time and space to produce a scalar time-space field pattern lattice with time as one axis and space as the other axis of a voice characteristic with each lattice point corresponding to a point of the time space analysis, converting each point of the time space field pattern lattice into a vector having a quantity parameter and an angular orientation parameter to form a vector field pattern lattice, quantizing the angular orientation parameter of the vector at each point of the vector field pattern lattice into one of N groups (where N is an integral number) with each of the N groups corresponding to a certain angular range of the vector angular orientation parameter, forming N two dimensional orientation pattern lattices, each corresponding to one of the N groups of angular orientation quantization of the vectors of the vector field pattern, the lattice point of each of said N two dimensional orientation pattern lattices having the vector quantity parameter of the point of the vector field pattern lattice of the corresponding angular orientation range, providing a standard pattern of a voice characteristic, and matching a pattern derived from said two dimensional orientation pattern lattices with said standard pattern.

18. A method of voice recognition as claimed in claim 17, wherein said space axis is a frequence axis.

19. A method of voice recognition comprising the steps therefor:

analyzing a voice signal inputted as a recognition object in time and space to produce a scalar time-space field pattern lattice with time as one axis and space as the other axis of a voice characteristic with each lattice point corresponding to a point of the time space analysis, converting each point of the time space field pattern lattice into a vector having a quantity parameter and an angular orientation parameter to form a vector field pattern lattice, quantizing the angular orientation parameter of the vector at each point of the vector field pattern lattice into one of N groups (where N is an integral number) with each of the N groups corresponding to a certain angular range of the vector angular orientation parameter, forming N two dimensional orientation pattern lattices, each corresponding to one of the N groups of angular orientation quantization of the vectors of the vector field pattern, the lattice point of each of said N two dimensional orientation pattern lattices having the vector quantity parameter of the point of the vector field pattern lattice of the corresponding angular orientation range, performing blurring processing of said two dimensional orientation pattern lattice with respect to at least one of the time axis and the space axis, and matching patterns derived from said two-dimensional patterns that were blurring processed with a standard voice characteristic pattern previously produced from a human voice signal.

20. A method of voice recognition as claimed in claim 19, wherein said blurring processing is performed only for the time axis when the voice characteristic to be recognized is from only one sex.

21. A method of voice recognition as claimed in claim 19, wherein said blurring processing for the time axis is performed more positively than that for the space axis.

22. A method of voice recognition as claimed in claim 19, wherein said blurring processing along the space axis is performed more positively in the case of voice characteristic extraction for both sexes as compared with that for one sex.

23. A method of voice recognition as claimed in claim 19, wherein said blurring processing is a mask operation processing of a mask pattern which has a preset weight value of a least 3×3 with respect to the time and space axes and a center point corresponding to the lattice point.

24. A method of voice recognition as claimed in claim 23, wherein said mask operation is repeated for a plurality of times.

25. A method of voice recognition as claimed in claim 19, wherein said blurring processing is a mask operation processing of a mask pattern which, with respect to each lattice point of each two-dimensional orientation pattern lattice, has a center point corresponding to said each lattice point, expands by more than two lattice points each in both directions of the time axis from said center point, and has a preset weight value.

26. A method of voice recognition as claimed in claim 25, wherein said weight values are all "1".

27. A method of voice recognition as claimed in claim 17, wherein said blurring processing is a mask operation processing of a mask pattern which, with respect to each lattice point of each two-dimensional orientation pattern lattice, has a center point corresponding to said each lattice point, expands by more than two lattice points each in both directions of the time axis from said center point, expands by more that one lattice point each in both directions of the space axis from said center point and has a preset weight value.

28. A method of voice recognition as claimed in claim 27, wherein said mask pattern expands more along the time axis than along the space axis.

29. A method of voice recognition as claimed in claim 27, wherein said weight values of the center point of said mask pattern and along the time axis are all "1", and that along the space axis is less than "1".

30. A voice recognition apparatus in which a scalar time-space field pattern lattice plane having a abscissa and an ordinate with one being the time axis and the other the space axis is obtained from a voice signal inputted as a recognition object, and a voice characteristic pattern based upon said time-space pattern is to be matched with a standard pattern to recognize the inputted voice, the apparatus comprising:

means for analyzing the inputted voice signal to obtain said scalar time-space field pattern, means for converting the scalar time-space field pattern into a vector field pattern lattice having each point corresponding to each lattice point of the scalar time-space field pattern lattice plane with each vector of the vector field pattern lattice having a quantity parameter and an angular orientation parameter, means for forming N (wherein N is an integral number) two dimensional orientation pattern lattices each corresponding to one of N angular range groups of the vector angular orientation parameter into which the angular orientation parameters of the vectors of the vector field pattern within a corresponding angular range fall, the lattice point of each of said N two dimensional orientation pattern lattices having the vector quantity parameter of the point of the vector field pattern lattice whose angular orientation parameter corresponds to the angular orientation range of the two dimensional orientation pattern range, and means for linearly matching a pattern derived from the N two-dimensional orientation pattern lattices as the voice characteristic pattern with said standard pattern.

31. Apparatus as in claim 30 further comprising means for normalizing the time-space pattern with respect to time prior to the converting of the time-space field pattern.

32. A voice recognition apparatus as claimed in claim 30, wherein said space axis is a frequency axis.

33. A voice recognition apparatus in which a scalar time-space field pattern lattice plane having a abscissa and an ordinate with one being the time axis and the other the space axis is obtained from a voice signal inputted as a recognition object, and a voice characteristic pattern based upon said time-space pattern is to be matched with a standard pattern to recognize the inputted voice, the apparatus comprising:

means for analyzing the inputted voice signal to obtain said scalar time-space field pattern, means for converting the scalar time-space field pattern to produce a vector field pattern lattice corresponding to each lattice point of the scalar time-space field pattern lattice plane with each vector of the vector field pattern having a quantity parameter and an angular orientation parameter, means for forming N (wherein N is an integral number) two dimensional orientation pattern lattices each corresponding to one of N angular range groups of the vector angular orientation parameter into which the angular orientation parameters of the vectors of the vector field pattern within a corresponding angular range fall, the lattice point of each of said N two dimensional orientation pattern lattices having the vector quantity parameter of the point of the vector field pattern lattice whose angular orientation parameter corresponds to the angular orientation range pattern lattice of the two dimensional orientations, means for blurring processing the lattice points of said two-dimensional orientation pattern lattices with respect to at least one of the time and space axes, and means for linearly matching the patterns that were blurring processed with said standard pattern.

34. Apparatus as in claim 33 further comprising means for normalizing the time-space pattern with respect to time prior to the converting of the time-space field pattern.

35. A voice recognition apparatus as claimed in claim 33, wherein said space axis is a frequency axis.

36. A voice recognition apparatus as claimed in claim 35, wherein said blurring processing means performs more positive blurring for the time axis than the space axis.

37. A voice recognition apparatus in which a scalar time-space field pattern lattice plane having an abscissa and an ordinate with one being the time axis and the other the space axis is obtained from a voice signal inputted as a recognition object, and a voice characteristic pattern based upon said time-space pattern is to be matched with a standard pattern to recognize the inputted voice, the apparatus comprising:

means for analyzing the inputted voice signal to obtain said scalar time-space field pattern, means for converting the scalar time-space field pattern to produce a vector field pattern lattice corresponding to each lattice point of the scalar time-space field pattern lattice plane with each vector of the vector field pattern having a quantity parameter and an angular orientation parameter, means for forming N (wherein N is an integral number) two dimensional orientation patten lattices each corresponding to one of N angular range groups of the vector angular orientation parameter into which the angular orientation parameters of the vectors of the vector field pattern within a corresponding angular range fall, the lattice point of each of said N two dimensional orientation pattern lattices having the vector quantity parameter of the point of the vector field pattern lattice whose angular orientation pattern corresponds to the angular orientation range of the two dimensional orientation pattern lattice, and means or non-linearly matching a pattern derived from the two-dimensional patterns with said standard pattern.

38. A voice recognition apparatus as claimed in claim 37, wherein said space axis is a frequency axis.

39. A voice recognition apparatus as claimed in claim 37, wherein said non-linear matching means is a DP (Dyndmic Programming) matching means.

40. A voice recognition apparatus as claimed in claim 37, further comprising means for blurring processing the two-dimensional patterns and providing the blurring processed pattern to the non-linear matching means.

41. A voice recognition apparatus as claimed in claim 40, wherein said non-linear matching means is a DP matching means.

42. A voice recognition apparatus as claimed in claim 37, wherein said converting means processes said vector field pattern in units of more than two plural frames successively from said time-space field pattern in a unit of more than 4 plural frames along the time axis extracted successively from said analyzing means, and said means for forming said two-dimensional orientation pattern lattices forms said lattices having the same number of frame successively from said vector field pattern of every plural frame extracted successively and further comprising, means for blurring processing of said two-dimensional orientation pattern lattices in a unit of plural frames formed successively in said forming portion of a two-dimensional orientation pattern, and second means for forming the two-dimensional patterns in one frame unit according to a prescribed procedure from said two-dimensional orientation pattern units of plural frames processed for blurring by said blurring processing means.

* * * * *